United States Patent [19]

McDonald

[11] 3,945,606

[45] Mar. 23, 1976

[54] GATE VALVE

[76] Inventor: Paul D. McDonald, 624 Laurel Lane, Lakeland, Fla. 33803

[22] Filed: Apr. 23, 1975

[21] Appl. No.: 570,579

[52] U.S. Cl. .................. 251/326; 251/329; 137/242
[51] Int. Cl.² ......................................... F16K 27/04
[58] Field of Search ............. 251/326, 329; 137/242

[56] References Cited
UNITED STATES PATENTS

| | | | |
|---|---|---|---|
| 2,842,283 | 7/1958 | Smith.............................. | 251/326 X |
| 3,170,670 | 2/1965 | Johnstone....................... | 251/326 X |
| 3,447,222 | 6/1969 | Bunch et al........................ | 251/329 |

Primary Examiner—Arnold Rosenthal
Attorney, Agent, or Firm—D. Paul Weaver

[57] ABSTRACT

A gate valve particularly for controlling the flow of chemicals and corrosives includes a knife edge gate and means to assure parallelism between the gate and a stainless steel gate seat in the valve casing. A bonnet on the top of the casing has guides for the gate and allows full withdrawal of the gate from the flow line without the necessity for the gate passing through the gate stem packing. Leakage of the valve is substantially eliminated.

10 Claims, 5 Drawing Figures

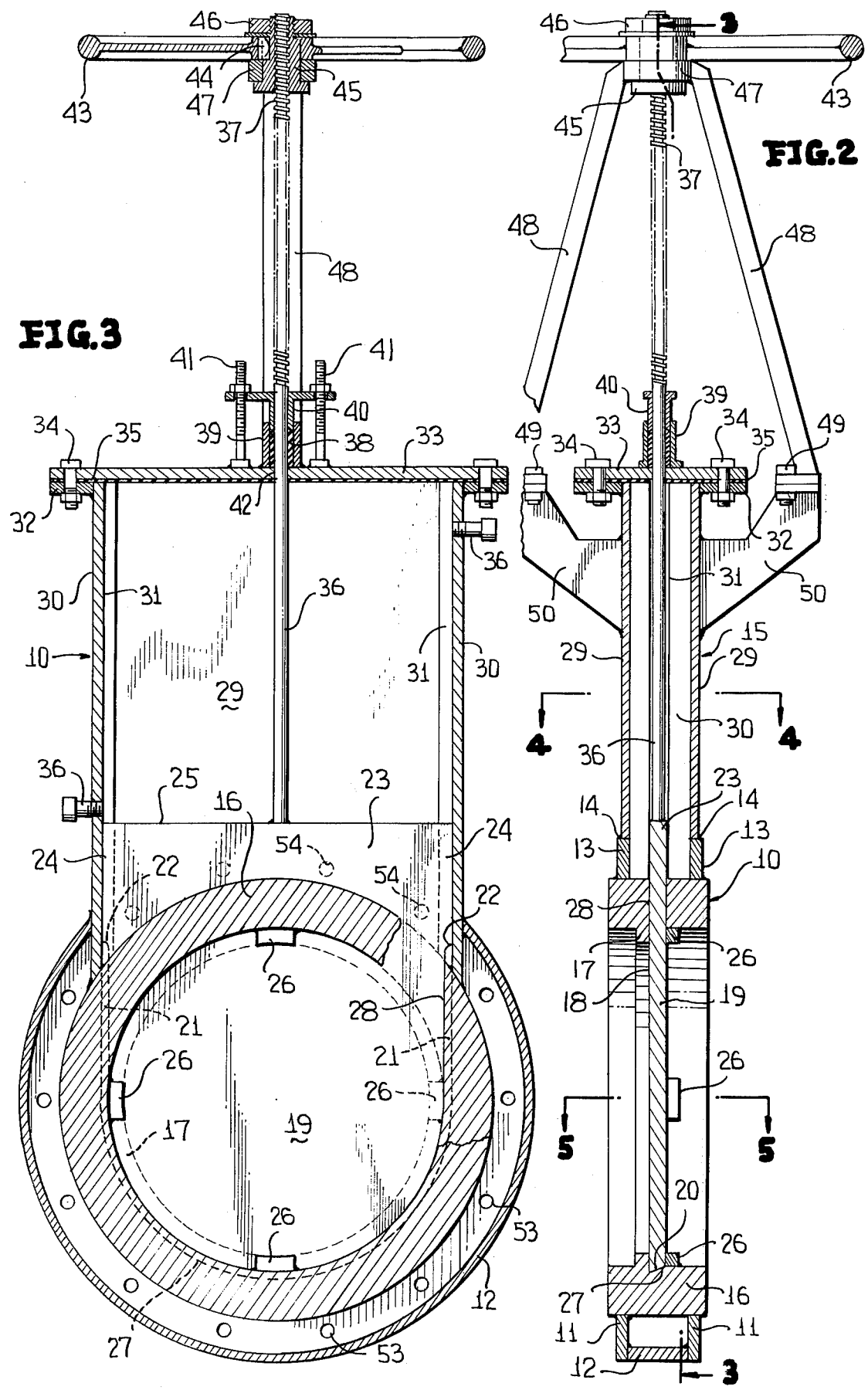

3,945,606

GATE VALVE

BACKGROUND OF THE INVENTION

The invention arises as a result of a need for a more reliable and efficient gate valve to control the flow of chemicals including corrosives without leakage and without constant maintenance to free the binding of parts as has been necessitated by prior art valve structures.

In achieving the objectives of the invention, a gate valve has been provided which employs a stainless steel knife edge gate and coacting stainless steel seat, together with means to assure true parallelism and face-to-face contact between the gate and its annular seat. Additionally, the valve employs a bonnet above the casing integrally secured thereto and having opposing parallel guide channels for the gate which further assure its freedom of moving without binding. The channels are provided with clean out means. The valve actuator stem passes through a packing gland above the bonnet cap or top plate and therefore the gate element does not engage or pass through a packing and is sliding contact during its operation with metal faces only. Leakage and binding of moving parts is substantially eliminated in the invention.

Other features and advantages of the valve will become apparent during the course of the following description.

BRIEF DESCRIPTION OF DRAWINGS

FIG. 2 is a central vertical section taken on line 2—2 of FIG. 1.

FIG. 3 is a vertical section taken on line 3—3 of FIG. 2.

DETAILED DESCRIPTION

Figure 1:
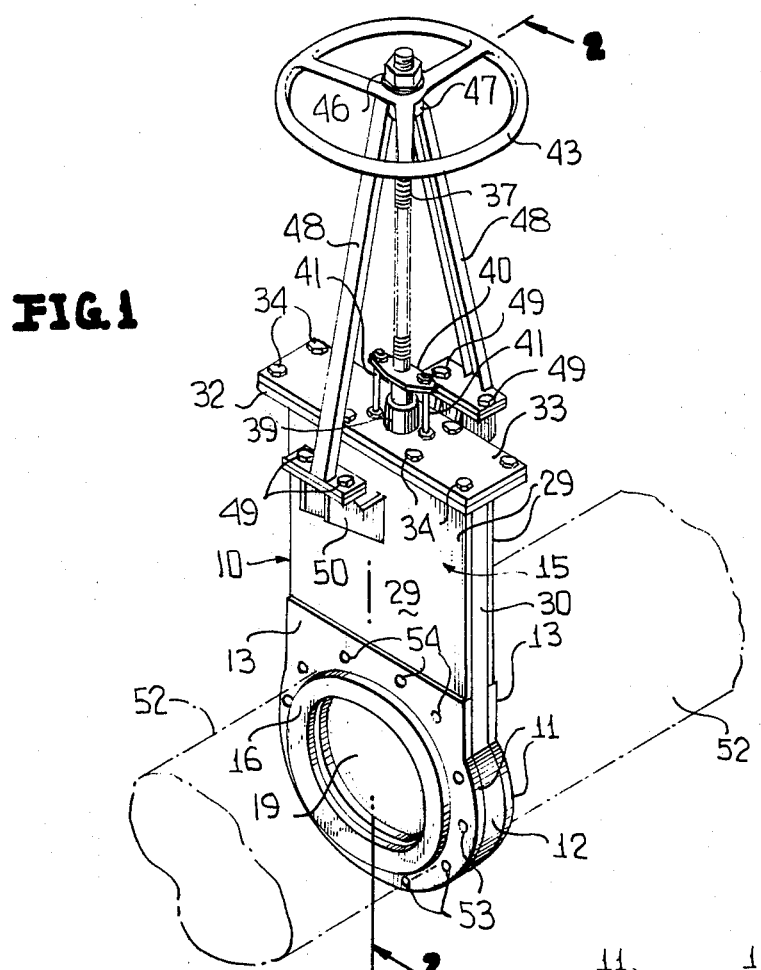
FIG. 1 is a perspective view of a gate valve embodying the invention.

Referring to the drawings in detail wherein like numerals designate like parts, a gate valve designated in its entirety by the numeral 10 comprises a body or casing formed of two opposing plates 11 and an intervening cylindrically curved spacer element 12 welded to the plates 11 to form therewith a unit. As best shown in FIG. 1, the plate 11 have top extensions 13 integral therewith for attachment by welding at 14, FIG. 2, to a bonnet 15 whose structure will be further described.

Figures 4, 5:
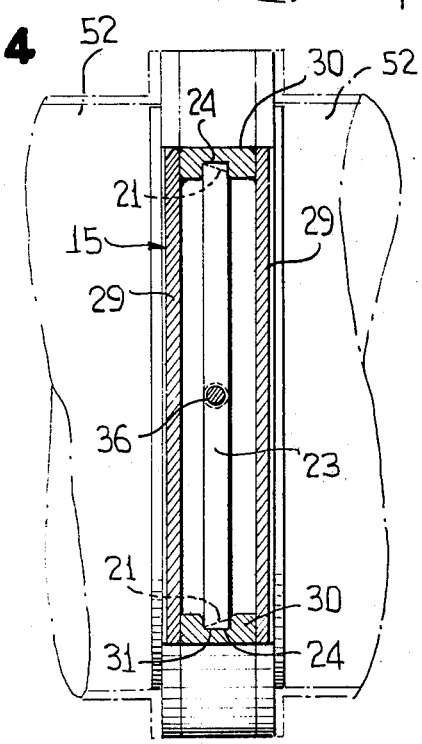
FIG. 4 is a horizontal section taken on line 4—4 of FIG. 2.
FIG. 5 is a horizontal section taken on line 5—5 of FIG. 2.

A sturdy stainless steel ring 16 is secured by welding or the like within aligned openings of the casing plates 11, and within the bore of the ring 16 centrally is an annular flange or shoulder 17 whose interior face is accurately formed to provide a true flat surface for seating the adjacent true flat face 18 of a preferably stainless steel gate 19 having a peripheral knife edge 20 extending entirely around its lower portion which is semicircular in form, FIG. 3. The knife or beveled edge 20 of the gate 19 extends above the axial center of the ring 16 in two parallel longitudinal sections or lengths 21 which terminate at 22, FIG. 3, substantially above the axial center of the lower valve casing or body. The upper portion 23 of the gate 19 is noncircular with parallel vertical square edge portions 24 and a top transverse right angular edge 25, as shown in FIGS. 3 and 4.

Welded in the bore of stainless steel ring 16 in spaced opposed relationship to the annular seat element 17 are plural gate truing lugs 26, preferably four in number and equidistantly spaced circumferentially on the ring 16. The ring 16 also has a beveled seating groove 27 to accept the gate knife edge 20 and conform to its shape and this groove, as best shown in FIG. 3, extends continuously around the lower circumferential side of the ring and gate. Above its axial center, the ring 16 is slotted at 28 centrally to allow vertical movement of the gate 19 during valve operation. The opposite sides of the slot 28, as viewed in FIG. 3, form straight parallel continuations of the arcuate groove 27.

The previously-mentioned bonnet 15 is rectangular in configuration and constitutes an integral top extension on the lower casing formed by the elements 11 and 12. The bonnet 15 comprises flat parallel side plates 29 and intervening relatively narrow spacer plates 30 welded or otherwise integrally joined to the side plates 29 to produce a box-like configuration open at its top end, a substantial distance above the annular casing. As shown in the drawings, the bonnet plates 30 have opposed parallel guide grooves 31 for the vertically movable gate 19, to assure proper alignment and guidance thereof during its vertical movement. The square edges 24 of the gate are slidably received by the guide grooves 31 during the operation of the valve. The gate 19 moves centrally through the bonnet 15, midway between the side plates 29. As shown in FIG. 2, the construction is symmetrical throughout.

Adjacent the open top of the bonnet 15, a marginal mounting flange 32 is welded thereto, and a bonnet cap or top plate 33 is firmly secured to this flange by bolts 34 with a compressible sealing gasket 35 intervened, as shown, to render the bonnet fluid-tight. Clean out plugs 36 for the guide grooves 31 are provided, preferably at the locations shown in FIG. 3.

The gate 19 is raised and lowered by a centrally attached rod or stem 36 which is provided with screw-threads 37 on its upper end portion above the bonnet 15. A packing 38 receives the smooth portion of gate stem 36, immediately above top plate 33, and this packing is contained within a sleeve 39 fixedly secured to the top plate centrally. A packing pusher 40 is received telescopically in the sleeve 39 and is adjustably held by a pair of upstanding threaded studs 41, rigidly attached to the top of plate 33 near opposite sides of the sleeve 39. Immediately below the packing 38, FIG. 3, the top plate 33 has an opening 42 receiving the stem 36 movably. The packing 38 assures no leakage of the bonnet around the gate stem, and a feature of the valve is that the gate per se does not intersect or pass through any nonmetal packing or seal.

The gate 19 and its stem 36 are caused to move vertically between valve open and valve closed positions by an upper hand wheel 43, keyed at 44 to an internally threaded bushing 45 which rotates with the hand wheel and has threaded engagement with stem portion 37. A hand wheel retainer nut 46 and washer are carried by the top of the rotary threaded bushing 45.

The bushing 45 is swiveled within a vertical bore of a fixed collar 47 carried by the top of a yoke having diverging arms 48 whose lower ends are attached at 49 to rigid brackets 50, welded or otherwise fixedly secured to the bonnet 15. By virtue of this construction, rotation of the hand wheel 43 will produce longitudinal movement of the stem 36 and gate 19 as a unit within the valve casing and bonnet. The gate may be elevated to the level of the top plate 33 and in this position the valve will be fully opened with the entire bore of the ring 16 unobstructed. The drawings show the gate valve fully closed with the knife edge 20 seated and the gate in full contact with the annular seat 17.

The valve casing is adapted to be coupled as at 51, FIG. 5, with the flanges of pipe sections 52, and toward this end a series of bolt receiving through openings 53 are provided around the lower part of the casing, with several tapped and threaded openings 54 in the top part thereof to receive pipe coupling screws.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A gate valve comprising a casing including a ring member whose bore defines a flow passage through the valve, an annular flange on the ring member projecting inwardly of said bore and having a side face forming a seat, the ring member having a beveled groove in the bore thereof adjacent said seat and the ring member having a slot substantially tangential to said groove opening through the upper side thereof, a bonnet on said casing extending upwardly therefrom and having opposite side guide grooves registering with and leading upwardly from said slot of the ring member, a plate-like valve element including a beveled edge movably engageable with said seat and said beveled groove through said slot and adapted in one position to completely close said bore defining said flow passage and in a second position to completely open said bore, said valve element in said second position rising into said bonnet, an actuating stem connected with said valve element and extending through and above said bonnet and being screw-threaded on a portion thereof above said bonnet, a packing means for said stem and slidably receiving the stem at the top of said bonnet, a hand wheel means having threaded engagement with said screw-threaded portion of the stem and operable to raise and lower the stem with said valve element, and support means for the hand wheel means secured to the bonnet and extending substantially thereabove and having a swiveled connection with the hand wheel means.

2. A gate valve as defined in claim 1, wherein the top of said bonnet is open, a removable top cover plate for the top of said bonnet having an opening receiving said stem movably, said packing means comprising an upstanding sleeve on the top cover plate surrounding said stem, a compressible packing within said sleeve surrounding said stem, a tubular packing pusher having telescopic engagement within said sleeve and engaging the top of said packing, and adjustable screw-threaded means interconnecting the packing pusher and said top cover plate of the bonnet.

3. A gate valve as defined in claim 2, and a compressible sealing gasket between the top of the bonnet and said top cover plate.

4. A gate valve as defined in claim 3, and at least a pair of removable clean out plugs on opposite sides of the bonnet adjacent said opposite side guide grooves of the bonnet.

5. A gate valve as defined in claim 1, and a plurality of circumferentially spaced gate valve element positioning and truing lugs on the bore of the ring member in space opposed relation to said seat and slidably contacting one face of said plate-like valve element.

6. A gate valve as defined in claim 1, and said hand wheel means comprising a rotary bushing having threaded engagement with said screw-threaded portion of said stem and having swiveled engagement with said support means, and a hand wheel keyed to said threaded bushing to turn therewith.

7. A gate valve as defined in claim 6, and said support means comprising an elevated support collar for said hand wheel having a swiveled connection with said bushing, and spaced downwardly divergent arms carrying the support collar at a fixed elevation above the bonnet and having lower ends anchored to opposite sides of the bonnet.

8. A gate valve as defined in claim 1, wherein said ring member and said plate-like valve element are formed of stainless steel.

9. A gate valve as defined in claim 1, and means on opposite sides of said casing to facilitate coupling the casing to a pair of axially aligned pipes with the bores of said pipes in substantial registration with said flow passage.

10. A gate valve as defined in claim 1, and said bonnet being hollow and rectangular in cross section with said guide grooves disposed centrally therein, said valve element having a rectangular cross section upper extension whose substantially square edges are engaged in said guide grooves.

* * * * *